(12) United States Patent
Rissanen

(10) Patent No.: US 8,970,600 B2
(45) Date of Patent: Mar. 3, 2015

(54) METHOD FOR VISUALIZATION OF TRANSMISSION FLOW IN A SYSTEM, AN OPERATOR TERMINAL AND A SUPERVISORY CONTROL SYSTEM

(75) Inventor: Mikko Rissanen, Kungsängen (SE)

(73) Assignee: ABB Research Ltd., Zurich (CH)

(*) Notice: Subject to any disclaimer, the term of this patent is extended or adjusted under 35 U.S.C. 154(b) by 615 days.

(21) Appl. No.: 13/265,698

(22) PCT Filed: Jun. 29, 2009

(86) PCT No.: PCT/EP2009/058128
§ 371 (c)(1),
(2), (4) Date: Oct. 21, 2011

(87) PCT Pub. No.: WO2010/121670
PCT Pub. Date: Oct. 28, 2010

(65) Prior Publication Data
US 2012/0038661 A1    Feb. 16, 2012

Related U.S. Application Data

(60) Provisional application No. 61/202,940, filed on Apr. 22, 2009.

(51) Int. Cl.
*G06T 11/20* (2006.01)
*G05B 23/02* (2006.01)
*G09G 5/02* (2006.01)

(52) U.S. Cl.
CPC ................. *G05B 23/0267* (2013.01)
USPC ........................................ 345/441; 345/592

(58) Field of Classification Search
CPC ............................ G06T 11/40; G06T 11/203
USPC ................................... 345/441, 592
See application file for complete search history.

(56) References Cited

U.S. PATENT DOCUMENTS 5,623,929 A     4/1997  Weng
2008/0215390 A1*  9/2008  Gipps et al. .................. 705/7
2009/0030556 A1*  1/2009  Castelli et al. ............... 700/286

OTHER PUBLICATIONS

Hurst W, "Video Browsing on Handheld Devices—Interface Designs for the Next Generation of Mobile Video Players", Multimedia, IEEE (vol. 5), 2008, p. 76-83.*
T.J. Overbye and J.D. Weber, "New Methods for Visualization of Electric Power System Information," Proc. IEEE Symp. Information Visualization (InfoVis '00), pp. 131-136, 2000.*

(Continued)

*Primary Examiner* — Devona Faulk
*Assistant Examiner* — Jin Ge
(74) *Attorney, Agent, or Firm* — Birch, Stewart, Kolasch & Birch, LLP

(57) ABSTRACT

A method for visualizing on a display unit of an operator terminal a transmission flow in a system. The method includes: retrieving a starting point and an end point of the transmission flow; generating a picture wherein a geometrical line from the starting point to the end point graphically represents the transmission flow and wherein a direction of the transmission flow is graphically represented by a continuously increased opacity of the geometrical line between the starting point and the end point of the transmission flow; and outputting the picture on the display unit.

20 Claims, 3 Drawing Sheets

(56) References Cited

OTHER PUBLICATIONS

D. Holten. Hierarchical edge bundles: Visualization of adjacency relations in hierarchical data. IEEE Transactions on Visualization and Computer Graphics, 12(5):741-748, 2006.*

Gilberto Pires De Azevedo et al: "Enhancing the Human-Computer Interface of Power System Applications" IEEE Transactions on Power Systems, IEEE Service Center, Piscataway, NJ, US, vol. 11, No. 2, May 1, 1996, pp. 646-653, XP011089206 ISSN: 0885-8950.

Klump R et al.: "Displaying aggregate data, interrelated quantities, and data trends in electric power systems" System Sciences, 2003. Proceedings of the 36th annual Hawaii International Conference on Jan. 6-9, 2003, Piscataway, NJ, USA, IEEE, Jan. 6, 2003, pp. 50-59, XP010626291 ISBN:978-0-7695-1874-9.

Klump R et al: "Visualizing Real-Time Security Threats Using Hybrid SCADA / PMU Measurement Displays", Jan. 3, 2005, XPO 10762358.

* cited by examiner

METHOD FOR VISUALIZATION OF TRANSMISSION FLOW IN A SYSTEM, AN OPERATOR TERMINAL AND A SUPERVISORY CONTROL SYSTEM

CROSS REFERENCE TO RELATED APPLICATIONS

This application is the National Phase of PCT/EP2009/058128 filed on Jun. 29, 2009, which claims priority under 35 U.S.C. 119(e) to U.S. Provisional Application No. 61/202,940 filed on Apr. 22, 2009, all of which are hereby expressly incorporated by reference into the present application.

FIELD OF THE INVENTION

The invention relates generally to the field of supervision and monitoring of a system such as an electrical power generation, transmission and/or distribution system or process, and in particular to graphical tools for such supervision. The invention relates more specifically to the visualization of a transmission flow in a system, for example a power flow in a power network.

BACKGROUND OF THE INVENTION

Supervision and monitoring of a system, in the following exemplified by a power network, is of great importance for ensuring proper functioning of the power network and for enabling right action to be taken. It is important that the operator of such the power network is enabled to quickly understand the status of the network and in particular to detect any fault conditions and to act rapidly upon such fault conditions.

The operator is supported in his or her task by a supervisory control system, which in the art is also known under the term SCADA (Supervisory Control and Data Acquisition) system. Such a supervisory control system interacts with the power network via system interface units. The units may for example obtain measurements from the power network and perform control actions on the power network. A supervisory control system comprises processing means to process the information coming from and going to the system interface units, data storing means to store measurements as well as data generated from the processing of measurements, such as alarms, statistical calculations etc., a human-machine interface in the form of at least one operator terminal and communication means for signal transmission from and to the system interface units and for data transmission between the processing means, the data storing means and the human-machine interface. The operator terminal comprises one or several display units showing different parts and data of the power network. It is inevitable that for large power networks, a huge amount of data is available to be displayed and needs to be monitored by an operator. The visual information or data should be presented to the operator in the best way possible, offering a best possible overview.

One type of information that is of importance to the operator of the power network is the actual power flow on the power transmission or distribution lines of the power network. The power flow can thereby be divided into active or real power flow, measured in VA (Volta-Ampere), and reactive power flow, measured in VAR (Volt-Ampere-Reactive).

Intuitive visualization of the flow of real and reactive power has proven to be difficult. Presently, only very simple visualization methods, usually comprising the use of arrows of different shapes, are available as a support for the operator of the power network. In FIG. 1, one such approach for displaying power flow is shown, known from a report which is downloadable from the Internet: Thomas. J. Overbye et al., Effective Power System Control Center Visualization. Power Systems Engineering Research Center; Final Report, PSERC Document 08-12, May 2008. Animated arrows 40 demonstrate the transmission flow of real power. The animated arrows move along the displayed power lines and the size of the arrows indicates the amount of transmission flow. These arrows 40 can be visually disturbing to the operator for example when they are presented in an overview picture of the power network covering hundreds of power lines. The arrows may clutter the overview picture and details may be difficult to see underneath the large arrows. If they are further combined with arrows showing the transmission flow of reactive power at the same time, the visual representation would cover an animation of two kinds of arrows that move in opposite directions, the arrows having different sizes. The overwhelming or even irritating effect of such a graphical representation is easily imaginable.

Such methods scale up poorly in visual terms and the operator gets lost in details when hundreds of animated arrows start to draw the operator's attention to each individual power line. In addition, the arrowheads cause severe clutter on the display.

SUMMARY OF THE INVENTION

In view of the above, it is a general object of the invention to provide means and methods for facilitating the task of supervision for the operator of a system such as a power network.

It is a particular object of the invention to provide means and methods for facilitating the visual supervision, by improving the way of visualizing a transmission flow in the system, such as a power flow in the power transmission and distribution lines of a power network.

These objects, among others, are achieved by a method, an operator terminal and a supervisory control system as claimed in the independent claims. Embodiments of the invention are claimed in the dependent claims.

In accordance with the invention, a method is provided for visualizing on a display unit of an operator terminal a transmission flow in a system. The method comprises the steps of: retrieving a starting point and an end point of the transmission flow; generating a picture wherein a geometrical line from the starting point to the end point graphically represents the transmission flow and wherein a direction of the transmission flow is graphically represented by a continuously increased opacity of the geometrical line between the starting point and the end point of the transmission flow; and outputting the picture on the display unit. By means of the invention, the transmission flow of real power is graphically presented without using arrows that overlap the lines and even take space which is wider than the line width. Thereby, the problem of cluttering is eliminated or at least reduced. In addition, the variation of opacity reduces the cluttering since the geometrical lines representing the transmission lines are present in the picture in any case. An animation is not needed. Therefore, the invention provides a solution that is more scaleable, so that hundreds or even thousands of transmission lines, e.g. power lines, can be shown at the same time without stressing the eye of the operator through animations and/or arrows of different shapes and sizes.

In accordance with an embodiment of the invention, the method comprises the further steps of: retrieving a length of time during which the transmission flow has been active in the system; and generating the picture with an opacity level that is increasing with increasing length of time in the direction of the transmission flow. Taking into account and graphically representing the timely aspect of a transmission flow is a new functionality which gives the operator valuable information. For example, if the system is a power network and the transmission flow a flow of real power, the operator is given information on whether the real power flow is well established on the power line. The opacity level may reach its maximum when the length of time exceeds a predefined limit.

In another embodiment of the invention, the step of retrieving the length of time and the step of generating the picture is performed repeatedly, thereby updating the picture continuously with the latest development and providing the operator with the most recent status of the transmission flow.

In still another embodiment of the invention, the method comprises the steps of retrieving a capacity value of the transmission flow, and generating the picture with the width of the geometrical line corresponding to the capacity value.

In yet another embodiment of the invention, the method comprises the steps of retrieving a load percentage value of the transmission line, and generating the picture with the geometrical line being graphically represented by a pair of inner lines having a first width there between, and a pair of outer lines having a second width there between. The first width is determined and mapped in correspondence with the load percentage value and the second width is determined and mapped in relation to the capacity value. A very intuitive picture is thereby provided, whereby the operator is able to swiftly see whether the load percentage value is reaching the maximum capacity of the system. He or she may then quickly take action, if required.

In still another embodiment of the invention, the method comprises the further step of generating the picture by embedding at least one arrow into the geometrical line with the arrow pointing from the end point to the starting point of the transmission flow, thereby indicating the direction of the transmission flow. In some applications this may be valuable and helpful additional information of the transmission flow.

The method is applicable to a number of areas: the system may comprise a power network and the transmission flow may then comprise flow of real power of a power line of the power network; or the system may comprise a water purification and distribution system and the transmission flow may then comprise a flow of water; or the system may comprise an oil and gas production and distribution system and the transmission flow may then comprise a flow of oil and/or gas. A method applicable in a wide variety of areas is thus provided.

According to the invention, an operator terminal and a supervisory control system performing the inventive method steps are provided.

Further features and advantages of the invention will become clear from the detailed description below and the attached drawings.

DETAILED DESCRIPTION OF EMBODIMENTS OF THE INVENTION

Figure 1:
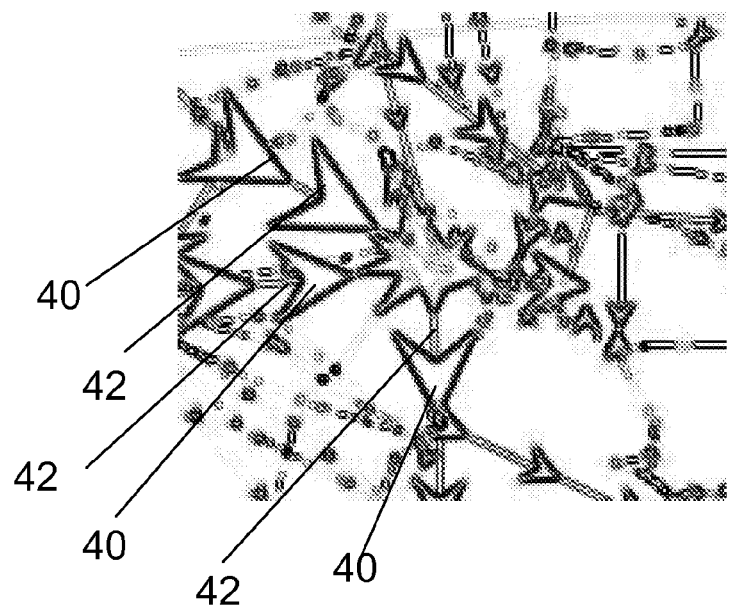
FIG. 1 illustrates a prior art visualization method.
Figure 2:
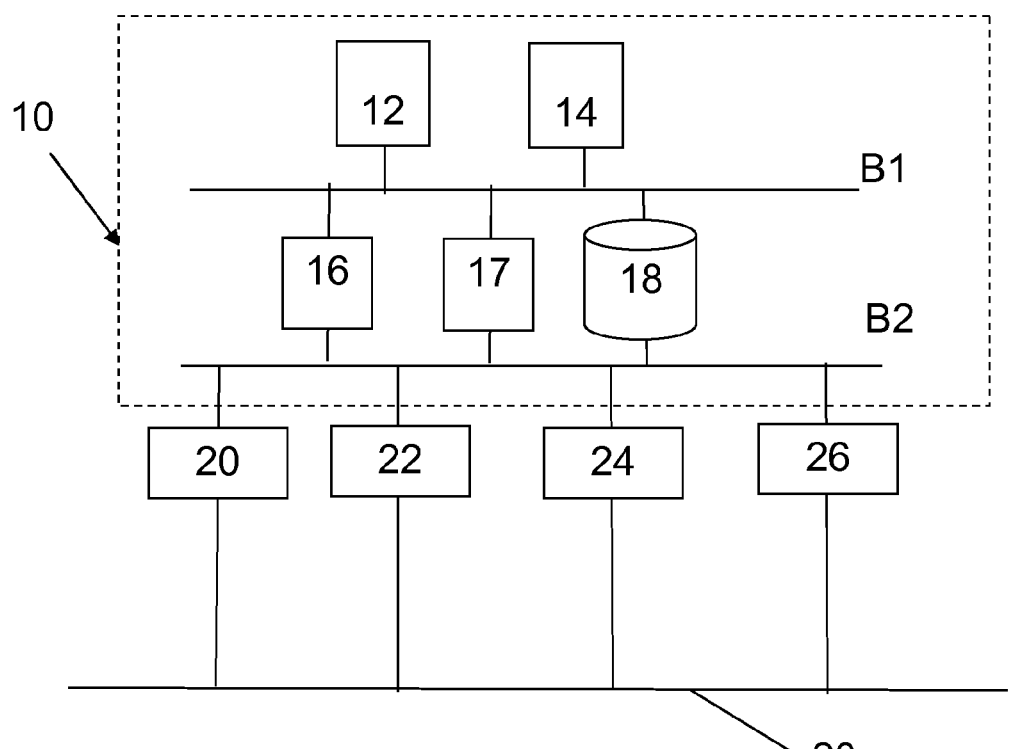
FIG. 2 illustrates a supervisory control system in accordance with an embodiment of the present invention.

FIG. 2 illustrates schematically a supervisory control system 10 in accordance with the present invention. The supervisory control system 10 may for example be an object based computerized system for controlling a system or part of a system.

The system 21 to be supervised may be any system comprising a transmission flow to be represented visually. The system may for example comprise a power network 21 comprising electrical power generation, transmission and/or distribution systems. Further examples of systems to be supervised, and which may benefit from the present invention, comprise water purification and distribution systems, oil and gas production and distribution systems, other petrochemical, chemical, pharmaceutical or food processing systems, as well as pulp and paper production systems.

In the following, the invention is exemplified by the power network, which may be supervised and monitored through an operator terminal. The operator terminal communicates with a control server handling monitoring and control of the processes.

In FIG. 2 the supervisory control system 10 is illustrated as comprising two operator terminals 12 and 14 connected to a first communication bus B1. The supervisory control system 10 may however comprise any number of operator terminals. The supervisory control system 10 may comprise a second communication bus B2 and between the first and second communication busses B1, B2 there are connected a first server 16 providing control of the power network 21, a second server 17 providing monitoring of the power network 21 and a database 18. In the database 18 relevant data may be stored, such as data relating to the control of the power network 21, monitoring of the power network 21, data representing the configuration of the power network 21 etc. In the present application, all such data is denoted system data.

The first server 16 may be considered as a part of a control system, while the second server 17 may be considered as a part of a monitoring system.

A number of system interface units 20, 22, 24, 26, being part of the power network 21 and providing control of and measurements in the power network 21, are connected to the second communication bus B2. In the FIG. 2, four such system interface units 20, 22, 24 and 26 are illustrated as being connected to the power network 21, although any number is conceivable. The power network 21 is here illustrated as further comprising a power line 28. The power network 21 comprises yet additional parts not illustrated in the FIG. 2, such as for example electrical power generation means. It should be realized that some of these system interface units 20, 22, 24 and 26 may be provided only for control purposes, some only for measurement purposes and some for both control and measurement purposes. Such system interface units 20, 22, 24 and 26 are thus involved in controlling the power network 21 and/or measuring properties of the power network 21.

The system interface units 20, 22, 24 and 26 may comprise elements directed towards measuring for example current and/or voltage of the power network 21, elements for measuring power measuring elements such as current transformers and voltage transformers, as well as elements directed towards control operations such as circuit breakers, relays, power semiconductor switches and tap changers. These are just a few of several different possible types of elements that can be provided in the system interface units 20, 22, 24, 26 of the power network 21.

The first server 16 receives measurements made in the power network 21 via some of the system interface units 20, 22, 24, 26 and controls the power network 21 via other of the system interface units 20, 22, 24, 26 based on these measurements. The first server 16 also stores historical process control data in the data base 18.

The second server 17 receives measurements via the system interface units 20, 22, 24, 26 as well as status data concerning the operation of the system interface units 20, 22, 24, 26 and can generate alarm and event data that may be presented to a user via the operator terminals 12 and 14. The second server 17 can also shut down parts of or the whole power network 21. Also alarm and event data may be stored in the database 18.

In the example of FIG. 2, a so called Network Manager system, developed by and available from ABB, runs on the supervisory control system 10. The Network Manager system belongs to the group of SCADA (Supervisory Control And Data Acquisition) systems, and is particularly intended for the supervision and control of power networks or gas systems.

Figure 3:
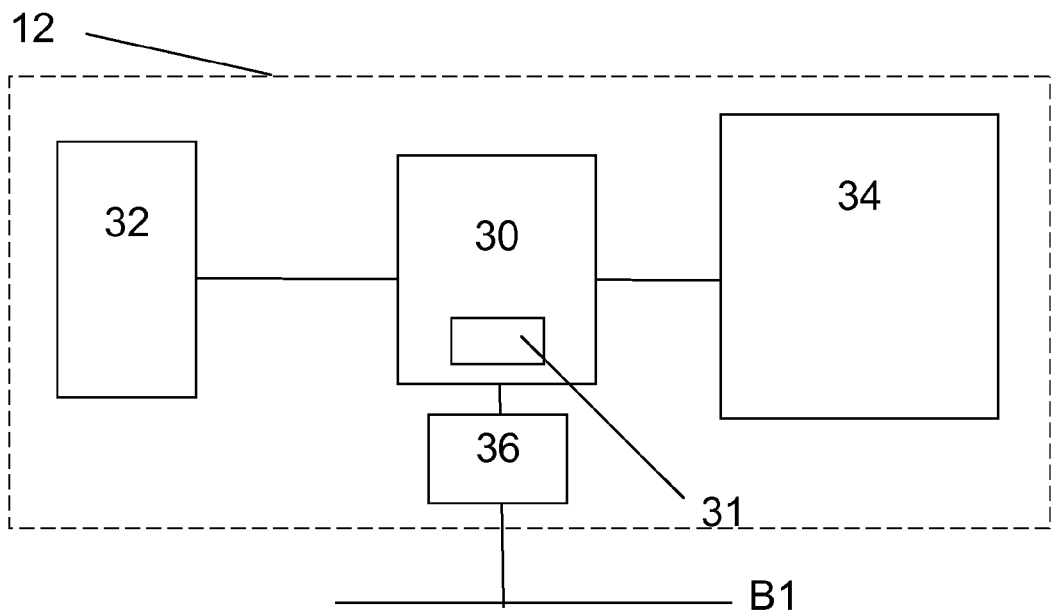
FIG. 3 illustrates an operator terminal for use in a supervisory control system in accordance with an embodiment of the present invention.

The operator terminals 12 and 14 in the supervisory control system 10 each provide a user interface to the Network Manager system. In the following, the details of such an operator terminal are explained based on the example of operator terminal 12, shown in FIG. 3. The operator terminal 12 includes a user input unit 32, a display unit 34, a control unit 30 and an interface 36 for communicating with the supervisory control system 10 via the first bus B1.

As mentioned earlier, the operator terminal 12 provides a graphical user interface for an operator of the supervisory control system 10. The control unit 30 may be a processor comprising associated program memory including program code for performing the functionality of the present invention. In particular, the control unit 30 comprises means, such as program code, for performing a method in accordance with the invention.

The user input unit 32 is a unit through which a user of the operator terminal 12 may enter data, for example a keyboard, a keypad or a mouse. The user input unit 32 may also be combined with the display unit 34 in order to form a touch screen.

The operator terminal 12 may further include other user interfaces such as a loudspeaker or a microphone in order to present and receive data to and from one or more users of the operator terminal 12 in other ways than through the display and keyboard. An operator terminal 12, 14 in the supervisory control system 10 is only one example of a computer in which the present invention may be realized.

The control unit 30 fetches or retrieves from the database 18 of the supervisory control system 10 measurement and calculation data related to the transmission flow of real and reactive power on different power lines 28 of the power network 21. The control unit 30 further transforms the data into graphical information and outputs the graphical information on display unit 34 in order to present visually to the operator the situation of the power flow within the power network 21.

In accordance with the invention, a more intuitive graphical representation is provided, compared to known methods. Briefly, the solution is visually more subtle, yet the representation is clear and distinct to the operator. In the examples below, a geographical map is used as background information for the location of the displayed power lines 28 of the power network 21. However, the invention is equally well applicable to single-line diagrams, which are the standard schematic representation of systems in electrical engineering.

Examples of different characteristics of the power flow and/or of the corresponding power line 28 which may be presented graphically comprise:
1) the capacity of the power line which is usually measured in kilovolts, kV,
2) the current or actual load, which is given in % of the capacity, also in kV,
3) the direction of the transmission flow's real power, given in VA, and
4) the direction of the transmission flow's reactive power given in VAR.

Figure 4:
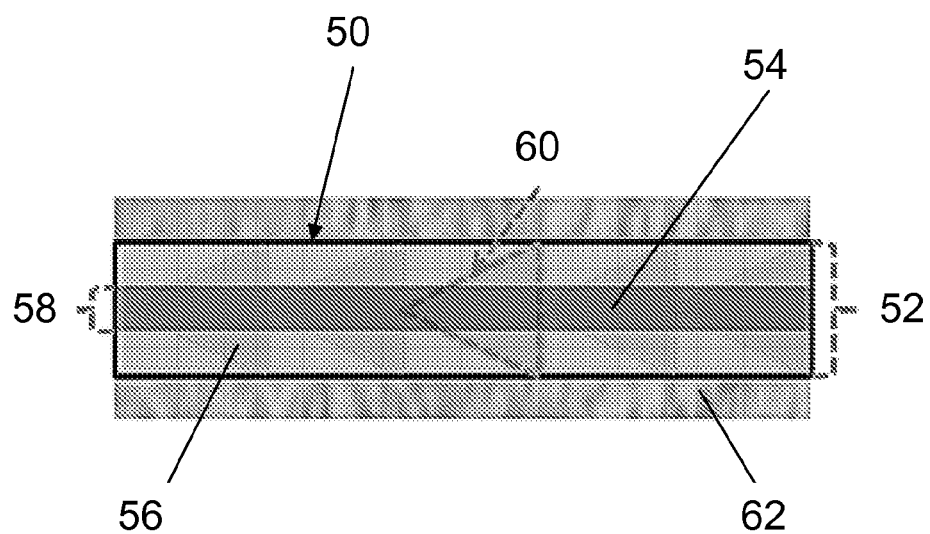
FIG. 4 illustrates an example of a visual representation in accordance with an embodiment of the invention.

These characteristics are, according to the invention, mapped by visual features. An example of an embodiment of such mapping is shown in FIG. 4.

Figure 5:
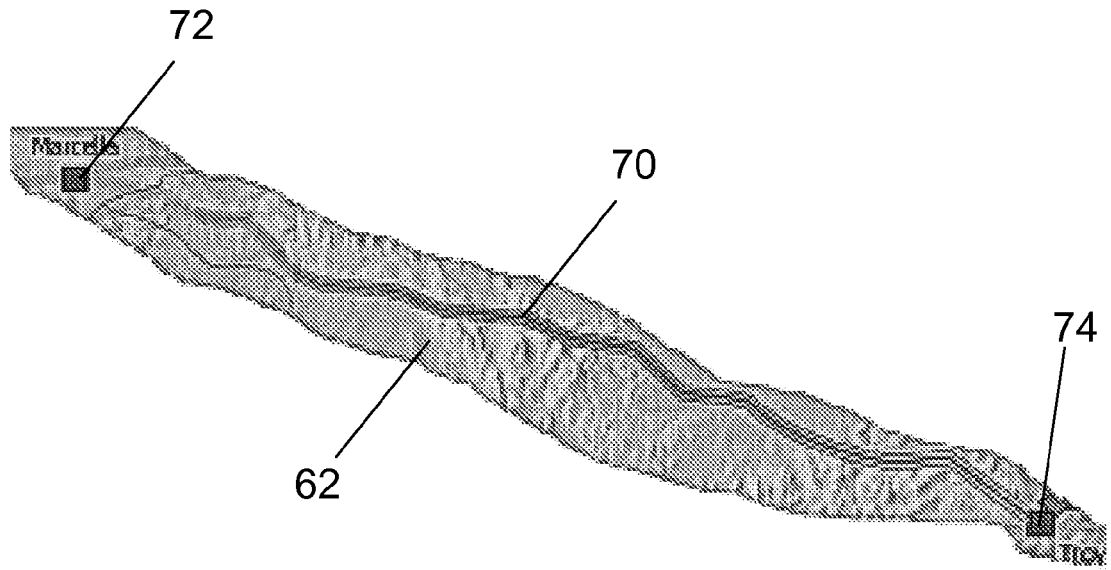
FIG. 5 illustrates another example of a visual representation in accordance with an embodiment of the invention.

In the embodiment of the invention according to FIG. 4, the visual features used are as follows:

Texture of the Displayed Power Lines:
  The power line 50 is drawn, i.e. graphically represented, with an inner line 54 having a width indicated at 58, and an outer line 56 having a width indicated at 52. The width 52 of the outer line 56 is determined and mapped in relation to the power line's 50 capacity (kV).
  The width 58 of the inner line 54 indicates the transmission load percentage of the power line 50. The transmission load is proportional to the capacity. In this example, the momentary load is at about 33% of the power line's 50 capacity. That is, the width 58 illustrating the load is one third of the width 52 that illustrates the capacity of the power line 50. This provides a very illustrative and intuitive visual representation to the operator, who is able to easily see when or if the momentary load is approaching the upper limit of the power line's 50 capacity.
  The presentation with the inner line 54 and the outer line 56 could also be described as a longitudinal section through a co-axial line. The two lines 54, 56 then appear as two tubes that is chosen here as a metaphor for representing current load and still available capacity, where the still available capacity is equivalent to the difference between the outer width 52 and the inner width 58.
  A texture is mapped in relation to the amount of reactive power (VAR) as small embedded arrows 60 inside the power line 50 which can be illustrated as appearing to "go" against the real power's (VA) direction indicated by opacity (described below). Power lines that do not have reactive power do not have a texture either. However, it is to be noted that the illustration of reactive power may be omitted, even if there is reactive power, depending e.g. on whether there is a need to supervise it.
  In FIGS. 4 and 5, the power lines 50 and 70, respectively, are overlaid on a geographical map 62. The power lines 50, 70 are represented by geometrical lines that correspond to how the power lines 50, 70 are actually laid out, for example between two power stations.

Opacity of Power Lines:
  Opacity is mapped in relation to the transmission flow's real power, so that at a starting point 72 of the transmission flow, which may for example be at a power station (see FIG. 5, first power station, Marcella), the power line 70 appears partially transparent. At the end point 74 of the transmission flow (see FIG. 5, second power station, Troy), the power line 70 appears solid without transparency. Preferably, this mapping does not change according to the user-controlled abstraction level.
  The point at which the opaque area starts may be related to time. A power line 70 which is transparent for most parts, i.e. wherein the opaque area starts close to the end point 74, indicates that the transmission flow has been active for just a little while. A power line 70 that is transparent about halfways from the starting point 72 to the end point 74, as is depicted in FIG. 5, means that the transmission flow has been active for over a certain limit of time, e.g. more than 10 minutes, wherein the limit of time may be user-defined. A power line 70 that is even more opaque, from a certain distance from the starting point of the power line 70 to the end point 74, has been active for yet another duration of time. In order for the transmission flow direction to be easily perceived, the opacity level cannot be constant all the way from the starting point to the end point. Stated differently, the opacity level cannot be constant throughout the whole transmission line as the transmission flow direction would then not be possible to determine.

By means of the invention, the indication of the transmission flow of real power via opacity of the displayed power line is a rather static and visually scaleable way to display transmission flow on multiple power lines. The eye-irritating animation as provided in the known methods is thus not needed; in particular, the arrows previously used can be eliminated.

Instead of using the size of the arrows to indicate the amount of transmission flow, as in the prior art, texture and opacity as described above is used.

Figure 6:
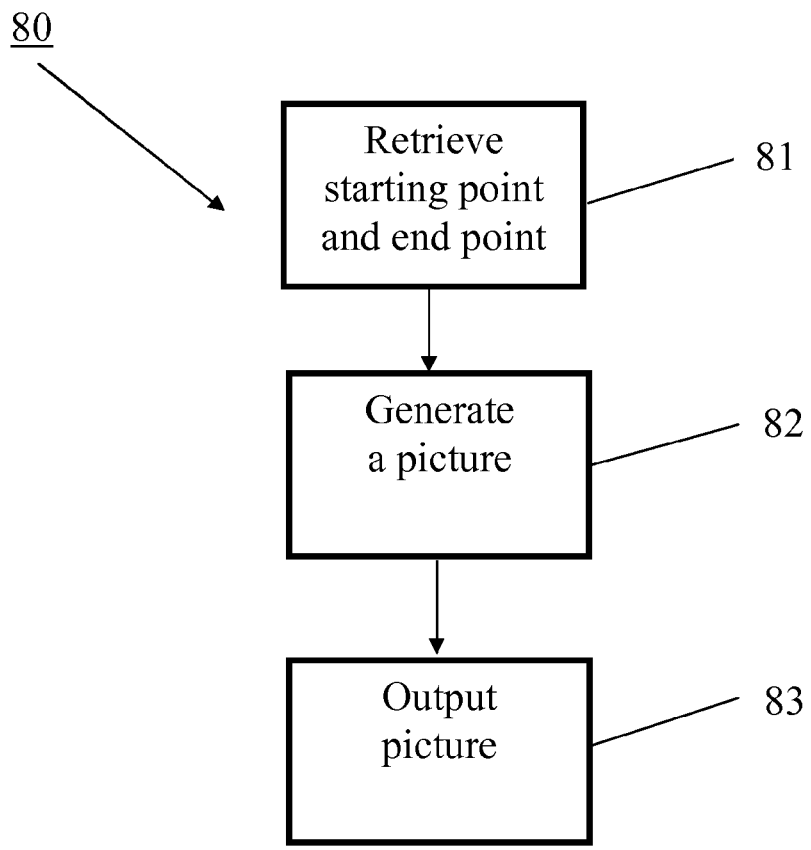
FIG. 6 illustrates a flow chart over steps included in the method in accordance with the invention.

FIG. 6 illustrates steps of a method in accordance with the present invention. The method 80 provides a way for visualizing a transmission flow in a system 21. The visualization is displayed on a display unit 34 of an operator terminal 12, 14.

The method 80 comprises the first step of retrieving 81 a starting point 72 and an end point 74 of the transmission flow. If the system to be supervised comprises a power network, then the starting point 72 and the end point 74 may for example comprise different power stations, between which a power line 28, 50, 70 is arranged. If the system to be supervised is an oil and gas production and distribution system, then the starting point may be an oil-rig and the end point an oil refinery, or the starting point may be the oil refinery and the end point an end user. In short, the starting point and end point represents points between which there is a transmission flow of some kind.

The method 80 comprises the second step of generating 82 a picture wherein a geometrical line from the starting point to the end point graphically represents the transmission flow. The geometrical line may correspond to the actual traveling of the transmission flow between the starting point and the end point. For example, in the case of the system being a power network, the geometrical line may, as mentioned earlier, represent power lines and the geometrical line may then correspond to how the power lines are actually drawn, for example between two power stations. The direction of the transmission flow is graphically represented by an increasing opacity, preferably continuously increased opacity, of the geometrical line between the starting point and the end point of the transmission flow. That is, at the starting point, the transmission flow appears as partially transparent, and at the end point the transmission flow appears as fully opaque. The transmission flow direction is thus easily determined by the operator.

The method 80 comprises the third step of outputting 83 the generated picture on the display unit 34. This may be done in any conventional manner.

The method 80 may comprise yet additional steps. In an embodiment, the method 80 comprises the step of retrieving 84 a length of time during which the transmission flow has been active in the system 21, and the step of generating 85 the picture with an opacity level that is increasing with increasing length of time in the direction of the transmission flow. The "opacity level" is to be understood as the amount of the geometrical line that is opaque, i.e. the starting point for the opacity part of the geometrical line is of interest. That is, the longer time that has passed, the larger part of the geometrical line is opaque. The opacity level may reach its maximum when the length of time exceeds a predefined limit. A power line that has been active for a certain duration of time, e.g. 10 minutes, may have an opaque area starting midways between the starting point and the end point.

The step of retrieving the length of time and the step of generating the picture may be performed repeatedly, for example every or every other minute.

In another embodiment, the method 80 comprises the step of retrieving a capacity value of the transmission flow and the step of generating the picture with the width of the geometrical line corresponding to the capacity value. The capacity may for example be expressed in kV, in the case of the transmission flow being a power flow; or litres/s in the case of the transmission flow being oil or gas flow, etc.

In still another embodiment, the method 80 further comprises the step of retrieving the load percentage value of the transmission line, and the step of generating the picture with the geometrical line being graphically represented by a pair of inner lines 54 having a first width 58 there between, and a pair of outer lines 56 having a second width 52 there between. The first width 58 is determined and mapped in correspondence with the load percentage value and the second width 52 is determined and mapped in relation to the capacity value.

In yet another embodiment of the invention, the method 80 comprises the further step of generating the picture by embedding at least one arrow into the geometrical line, wherein the arrow points from the end point to the starting point of the transmission flow, thereby indicating the direction of the transmission flow. This is the most intuitive when the system is a power network. In case of the system being e.g. an oil distribution system, it would be more intuitive to have the arrows point from the starting point to the end point.

For the case of the system being a power network the following points can be summarized: the transmission flow of real and also reactive power is graphically presented in way which is intuitively understandable for the operator. The visual features used to represent the transmission flow of real and reactive power, i.e. opacity and an arrow texture, differ clearly from each other so that they do not collide in the operator's visual impression of the power line. Instead they are clearly distinguishable.

The proposed solutions cover intuitive mapping of several important parameters in power lines to static visual features of the graphical representation of the power line. Thereby, a simultaneous graphical representation of different characteristics of the power flow and/or of the corresponding power line is allowed.

In addition, the representation can include the time aspect, i.e. when the operator is looking at a power line of the power network it is possible for him to see approximately how long the transmission has flown towards the currently shown direction. The solution is applicable to geographical maps as well as to single-line diagrams.

The invention further provides an operator terminal 12, 14 of the supervisory control system 10, the operator terminal 12, 14 comprising a user input unit 32, a display unit 34 and a control unit 30. The control unit 30 comprises means 31, such as software, hardware or any combination thereof, for performing steps of the method 80 as described above. The control unit 30 comprises, among other means, means for generating the desired picture.

The invention also provides a supervisory control system 10 for supervising a system 21 such as the above exemplified power network. The system 21 comprises system interface units 20, 22, 24, 26, which in turn comprises means for taking measurements from and perform control actions on the system 21. The supervisory control system 10 further comprises: processing means 16, 17 for processing signals received from or sent out to the system interface units 20, 22, 24, 26; data storing means 18 for storing the measurement values and data generated by the processing means 16, 17 from the processing of measurements; and an operator terminal 12, 14 as described above. The processing means 16, 17 thus retrieves and processes data such as the length of time during which the transmission flow has been active in the system 21; retrieves a capacity value of the transmission flow and processes the values so as to correspond the width of the geometrical line with the capacity value; retrieves a load percentage value of the transmission line, and processes the data so that different widths associated with the geometrical line corresponds to value and a total capacity value, etc.

The invention claimed is:

1. A method for visualizing on a display unit of an operator terminal a transmission flow in a system comprising a power network, the method comprising the steps of:
retrieving a starting point and an end point of said transmission flow;
retrieving a length of time during which said transmission flow has been active in said system;
generating a picture with a geometrical line overlaid on a background, wherein the geometrical line, from said starting point to said end point, represents a power line and also graphically represents said transmission flow, wherein a direction of said transmission flow is graphically represented by a continuously increased opacity of said geometrical line between said starting point and said end point of said transmission flow with an opacity level starting at a distance from the end point on the line that is increasing with increasing length of time in said direction of said transmission flow; and
outputting said picture on said display unit.

2. The method as claimed in claim 1, wherein said opacity level reaches its maximum when said length of time exceeds a predefined limit.

3. The method as claimed in claim 1, wherein said step of retrieving said length of time and said step of generating said picture is performed repeatedly.

4. The method as claimed in claim 1, further comprising the steps of:
retrieving a capacity value of said transmission flow; and
generating said picture with the width of said geometrical line corresponding to said capacity value.

5. The method as claimed in claim 4, further comprising the steps of:
retrieving a load percentage value of said transmission line; and
generating said picture with said geometrical line being graphically represented by a pair of inner lines having a first width there between, and a pair of outer lines having a second width there between, wherein said first width is determined and mapped in correspondence with said load percentage value and wherein said second width is determined and mapped in relation to said capacity value.

6. The method as claimed in claim 1, further comprising the step of:
generating said picture by embedding at least one arrow into said geometrical line with said arrow pointing from said end point to said starting point of the transmission flow, thereby indicating the direction of said transmission flow.

7. The method as claimed in claim 1, wherein said transmission flow comprises flow of real power of a power line of said power network.

8. An operator terminal of a supervisory control system comprising:
a user input unit,
a display unit and
a control unit configured to
retrieve a starting point and an end point of said transmission flow,
retrieve a length of time during which said transmission flow has been active in said system,
generate a picture with a geometrical line overlaid on a background, wherein the geometrical line, from said starting point to said end point, represents a power line and also graphically represents said transmission flow, wherein a direction of said transmission flow is graphically represented by a continuously increased opacity of said geometrical line between said starting point and said end point of said transmission flow with an opacity level starting at a distance from the end point on the line that is increasing with increasing length of time in said direction of said transmission flow, and
output said picture on said display unit.

9. A supervisory control system for supervising a system comprising a power network, said system comprising system interface units configured to take measurements from and perform control actions on said system, said supervisory control system comprising a processing device for processing signals received from or sent out to said system interface units, a data storage device configured to store said measurements and data generated by said processing device from the processing of measurements and an operator terminal as claimed in claim 8.

10. The method as claimed in claim 2, wherein said step of retrieving said length of time and said step of generating said picture is performed repeatedly.

11. The method as claimed in claim 2, further comprising the steps of:
retrieving a capacity value of said transmission flow; and
generating said picture with the width of said geometrical line corresponding to said capacity value.

12. The method as claimed in claim 3, comprising the further steps of:
retrieving a capacity value of said transmission flow; and
generating said picture with the width of said geometrical line corresponding to said capacity value.

13. The method as claimed in claim 2, comprising the further step of:
generating said picture by embedding at least one arrow into said geometrical line with said arrow pointing from said end point to said starting point of the transmission flow, thereby indicating the direction of said transmission flow.

14. The method as claimed in claim 3, comprising the further step of:
generating said picture by embedding at least one arrow into said geometrical line with said arrow pointing from said end point to said starting point of the transmission flow, thereby indicating the direction of said transmission flow.

15. The method as claimed in claim 4, comprising the further step of:
  generating said picture by embedding at least one arrow into said geometrical line with said arrow pointing from said end point to said starting point of the transmission flow, thereby indicating the direction of said transmission flow.

16. The method as claimed in claim 5, comprising the further step of:
  generating said picture by embedding at least one arrow into said geometrical line with said arrow pointing from said end point to said starting point of the transmission flow, thereby indicating the direction of said transmission flow.

17. The method as claimed in claim 2, wherein said transmission flow comprises flow of real power of a power line of said power network.

18. The method as claimed in claim 3, wherein said transmission flow comprises flow of real power of a power line of said power network.

19. The method as claimed in claim 4, wherein said transmission flow comprises flow of real power of a power line of said power network.

20. The method as claimed in claim 5, wherein said transmission flow comprises flow of real power of a power line of said power network.

\* \* \* \* \*